United States Patent
Shanmugavelayutham et al.

(10) Patent No.: US 9,171,159 B2
(45) Date of Patent: Oct. 27, 2015

(54) PERFORMING SECURITY OPERATIONS USING BINARY TRANSLATION

(71) Applicant: Intel Corporation, Santa Clara, CA (US)

(72) Inventors: Palanivelrajan R. Shanmugavelayutham, San Jose, CA (US); Koichi Yamada, Los Gatos, CA (US); Ravi Sahita, Beaverton, OR (US); Arvind Krishnaswamy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,411

(22) PCT Filed: Feb. 28, 2013

(86) PCT No.: PCT/US2013/028233
§ 371 (c)(1),
(2) Date: Jun. 24, 2013

(87) PCT Pub. No.: WO2014/133520
PCT Pub. Date: Sep. 4, 2014

(65) Prior Publication Data
US 2014/0245446 A1    Aug. 28, 2014

(51) Int. Cl.
*G06F 21/62* (2013.01)
*G06F 21/56* (2013.01)

(52) U.S. Cl.
CPC .............. *G06F 21/566* (2013.01); *G06F 21/56* (2013.01); *G06F 21/567* (2013.01)

(58) Field of Classification Search
CPC ...... G06F 21/56; G06F 21/566; G06F 21/567
USPC .................................................. 726/24; 718/1
See application file for complete search history.

(56) References Cited

U.S. PATENT DOCUMENTS

| 5,926,832 A | 7/1999 | Wing et al. |
| 2003/0101381 A1* | 5/2003 | Mateev et al. ................. 714/38 |
| 2005/0010804 A1* | 1/2005 | Bruening et al. ............. 713/200 |

(Continued)

OTHER PUBLICATIONS

Reddi et al., 2007, Persistent Code Caching: Exploiting Code Reuse Across Executions and Applications, International Symposium on Code Generation and Optimization, Published by the IEEE Computer Society, pp. 1-13.*
Amit Vasudevan, et al., "Stealth Breakpoints," 2005, pp. 1-10.
Shiliang Hu, et al., "Reducing Startup Time in Co-Designed Virtual Machines," 2006, pp. 1-12.

(Continued)

*Primary Examiner* — Joseph P Hirl
*Assistant Examiner* — Stephen Gundry
(74) *Attorney, Agent, or Firm* — Trop, Pruner & Hu, P.C.

(57) ABSTRACT

In an embodiment, a processor includes a binary translation engine to receive a code segment, to generate a binary translation of the code segment, and to store the binary translation in a translation cache, where the binary translation includes at least one policy check routine to be executed during execution of the binary translation on behalf of a security agent. Other embodiments are described and claimed.

19 Claims, 10 Drawing Sheets

(56) References Cited

U.S. PATENT DOCUMENTS

| | | |
|---|---|---|
| 2006/0225135 A1 | 10/2006 | Cheng et al. |
| 2006/0288188 A1* | 12/2006 | Ma et al. ......................... 711/201 |
| 2008/0114985 A1* | 5/2008 | Savagaonkar et al. ........ 713/176 |
| 2009/0038008 A1* | 2/2009 | Pike ................................ 726/22 |
| 2009/0172644 A1* | 7/2009 | Nagarajan et al. ............ 717/128 |
| 2009/0271867 A1 | 10/2009 | Zhang |
| 2010/0306847 A1 | 12/2010 | Lambert et al. |
| 2011/0016508 A1 | 1/2011 | Wallace |
| 2011/0047542 A1* | 2/2011 | Dang et al. ......................... 718/1 |
| 2011/0107406 A1* | 5/2011 | Frost et al. ......................... 726/6 |
| 2011/0153307 A1* | 6/2011 | Winkel et al. ................... 703/26 |
| 2012/0117610 A1 | 5/2012 | Pandya |
| 2015/0082439 A1* | 3/2015 | Molnar et al. ................... 726/23 |

OTHER PUBLICATIONS

Shiliang Hu, "Efficient Binary Translation in Co-Designed Virtual Machines," 2006, pp. 1-183.

Ho-Seop Kim, et al., "Hardware Support for Control Transfers in Code Caches," 2003, pp. 1-12.

Ho-Seop Kim, "A Co-Designed Virtual Machine for Instruction-Level Distributed Processing," 2004, pp. 1-205.

Jiwei Lu, et al., "Design and Implementation of a Lightweight Dynamic Optimization System," 2004, pp. 1-24.

International Searching Authority, "Notification of Transmittal of the International Search Report and the Written Opinion of the International Searching Authority," mailed Nov. 26, 2013, in International application No. PCT/US2013/028233.

* cited by examiner

FIG. 10 ial logos that analyze the target code and produce an instrumented
PERFORMING SECURITY OPERATIONS USING BINARY TRANSLATION

BACKGROUND

Current anti-virus/anti-malware technologies are used to monitor critical application and kernel code for introspection to track illegal usage by malware or virus. The technique for monitoring critical code (such as application programming interfaces (APIs)) involves hooking the critical code and enforcing a detour to the anti-virus agent for introspection before allowing the critical code execution to continue.

One method used for hooking/detour to the anti-virus agent is instruction patching the original code for detour to the anti-virus agent. However the disadvantage of this method that it is intrusive and non-transparent. As a result hooks can be easily detected by the virus. Also, patching the original code becomes complex due to instruction boundary issues. For example, it is not safe to patch when the size of the original instruction replaced by the patch is smaller than the size of the patch instruction. It is also not safe to patch instructions that have return instruction pointer (RIP)-relative addressing since the anti-malware agent code executes at a different virtual address in the monitored address space.

Another such method is by page permission revocation such as marking a page having critical code as non-executable and steering control to the anti-virus agent via exceptions. A disadvantage of this method is that it has high overhead. In addition, there is the performance impact of taking exceptions. Moreover there can be a high number of false positives due to coarse-grained (e.g., 4 kilobyte (kB) page-level) hooking, which causes unnecessary context switches to the anti-virus agent for analysis.

DETAILED DESCRIPTION

In various embodiments, a hardware/software (HW/SW) co-designed processor that performs binary translation (BT) via a partial translation model may be used to provide low overhead and transparent code translation/instrumentation, enabling a faster and transparent detour mechanism without patching original code. To this end, a translated version of the original code may be produced with an in-lined analysis and one or more policy check functions. Via execution of this instrumented code, the frequency of expensive context switches to an anti-virus/anti-malware (AV/AM) agent may be reduced. In the partial translation model, only the target code is translated/instrumented (e.g., with x86 instrumentation) and the remainder of the code is executed natively (as the original x86 code). The translated/instrumented code is stored in a translation cache for access during execution, in an embodiment. Although embodiments described herein use a partial translation model, in other embodiments a full translation model may be used in which all code is translated by binary translation.

To realize partial translation, a processor can have two modes, a first mode where it directly executes instructions of a source instruction set architecture (ISA), which in one embodiment can be source ISA code (e.g., x86 code of an ISA for an Intel Architecture (IA)™ processor), and a second mode where it executes instructions of a target ISA (and which can be at micro-operation (uop) level, bypassing the processor's instruction decoders), which can be translated and optimized code stored in a translation cache such as a code cache. As used herein, the first mode may be referred to as a "native mode" or "native execution mode" and the second mode is referred to as a "binary translation execution mode."

Thus some portions of application/OS software may be fetched and executed directly via uops in the usual manner, while other portions of application/OS software are emulated via translation to the target instruction set. This process is referred to as partial translation. With partial translation, software can first be directly executed with good performance, and then based on profiling information, selected frequently-executed regions are translated and stored in a translation cache. This approach has the benefit of avoiding performance losses when software is first encountered while providing performance and/or power efficiency gains for software that is frequently executed.

In operation, an AV/AM agent profiles the code executing in the system and identifies critical kernel/user code that is to be monitored. The agent then invokes the BT software, which generates the instrumented version (with security checks embedded) of the critical code. Then during execution, the instrumented code is executed instead of the original code. The instrumented code transfers control to the security agent on a failure of one or more of the embedded checks.

In various embodiments, the AV/AM agent runs as part of an application/operating system/virtual machine monitor (VMM) environment and is responsible for identifying the target code to be monitored. The agent is also responsible for invoking the binary translation software to perform instrumentation. BT software in accordance with an embodiment of the present invention may support a partial translation model. In an embodiment, the BT software runs within a BT container of a processor, and implements binary translation algorithms to analyze the target code and produce an instrumented version of the code with appropriate security checks based on the policies determined by the AV/AM agent. In an embodiment, the BT container environment contains processor state for BT software and private memory space that holds code and data for BT software. The container environment also provides interfaces for invoking the BT software by the AV/AM agent.

A BT steering unit may be provided to implement processor support for enabling interaction between the partial translated code and the native code. It interfaces to the AV/AM agent for invoking the BT software, steering control from/to the target code to the instrumented code. In an embodiment, the steering is fine grained (less than page size) and does not use a page level trap/detour mechanism. Stated another way, the transfer to instrumented code may be for a critical code segment located in the middle of a memory page.

Thus binary translation and its hardware infrastructure may enable dynamic code execution monitoring of target code (e.g., critical APIs) without patching the original code and employing a quick and precise/fine grained (less than page size) detour mechanism to the translation version of the original code. This policy-based instrumented code may minimize transitions to the security agent and hence reduce the overhead of false positives.

Figure 1:
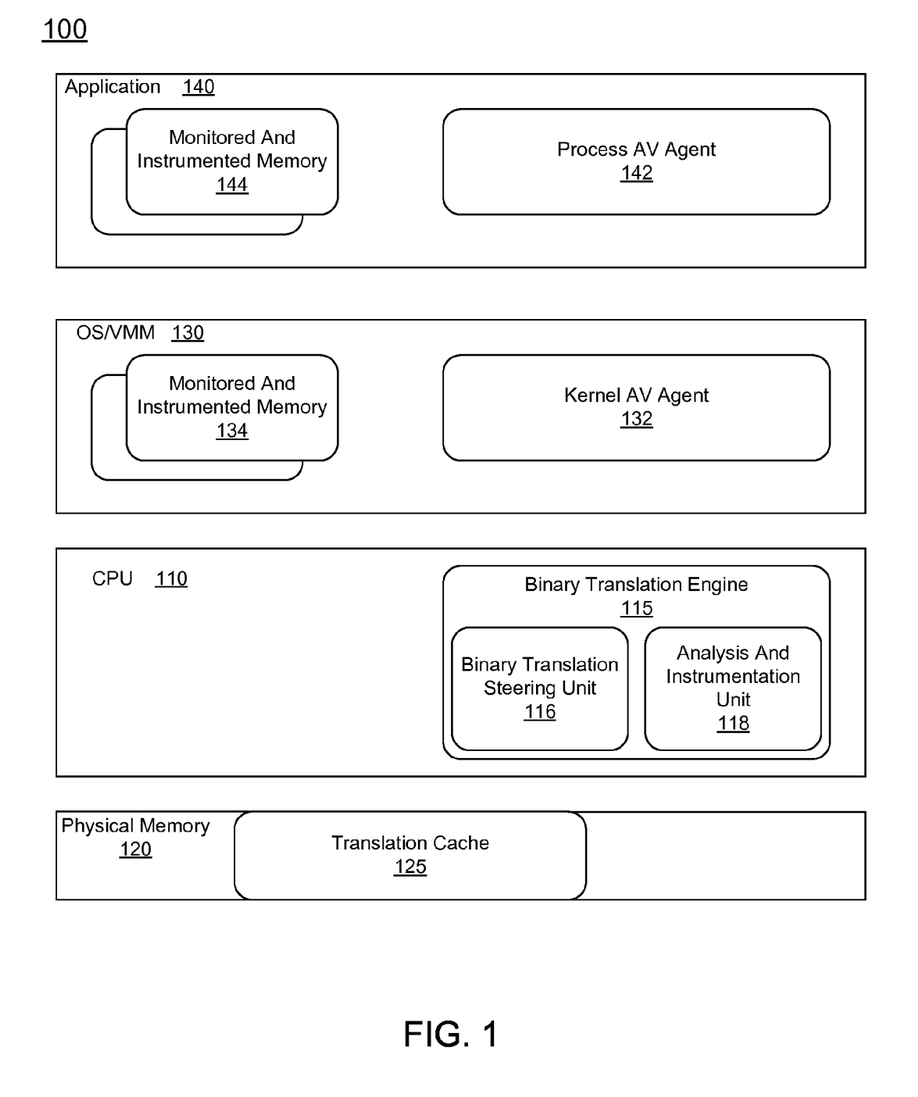
FIG. 1 is a block diagram of a system on which binary translation-executed security code can operate in accordance with one embodiment of the present invention.

Referring now to FIG. 1, shown is a block diagram of a system on which BT-executed security code can operate in accordance with one embodiment of the present invention. As seen in FIG. 1, system 100 is formed of hardware often referred to as bare platform hardware, including a processor 110 which in an embodiment may be a central processing unit (CPU) with one or more cores. As one such example, processor 110 may be a multicore processor, e.g., including 2, 4, 8 or another number of independent cores. In addition, the processor may include additional processing units such as graphics processors, fixed function units and so forth. As further shown in FIG. 1, processor 110 further includes a binary translation engine 115. In general, binary translation (BT) engine 115 may operate to perform binary translations of underlying code. In addition, BT engine 115 may provide a mechanism to enable redirection of code flow to one or more binary translations in a partial translation model.

As seen in the embodiment of FIG. 1, BT engine 115 includes a binary translation steering unit 116 and an analysis and instrumentation unit 118 (referred to herein as an instrumentation unit). Steering unit 116 may be used to enable steering of code execution during runtime from uninstrumented code to instrumented code and vice versa. In an embodiment, BT steering unit 116 may include one or more mapping tables to indicate correspondence between native code of a given process and one or more translated code segments. For example, each process may have a table to store a native entry point and a corresponding instrumented entry point such that when the native entry point is encountered during execution, a low overhead jump to instrumented code stored in instrumentation cache is performed. Meanwhile, instrumentation unit 118 may analyze uninstrumented code, e.g., responsive to profiling or responsive to instruction from another entity, and based on analysis of the code and/or profiling information perform a binary translation to thus instrument the code into an instrumented code segment.

This instrumented code segment may be stored in a translation cache 125 which may be located within a physical memory 120 coupled to processor 110. In an embodiment, physical memory 120 may be a dynamic random access memory (DRAM), a non-volatile memory or another storage within a platform. Of course, understand that during execution, at least some of the code may be stored in one or more cache memories of the processor (not shown for ease of illustration in FIG. 1).

Further illustrated in FIG. 1 is a software model that executes upon the bare platform hardware. Specifically shown in FIG. 1 is an OS/VMM 130 which may act as supervisor/hypervisor software to control execution. In the embodiment shown OS/VMM 130 may include a kernel AV agent 132 (note that "AV" is used herein generally to refer to anti-virus and/or anti-malware software) that may be configured to be aware of the BT capability of the processor and to instruct BT engine 115 to perform binary translation of one or more code segments, either within OS/VMM 130 or within one or more applications 140 executing in the OS/VMM environment. For example, as a result of profiling that indicates a hot code segment or other critical code segment such as an API, specific instructions such as syscalls or others, kernel AV agent 132 may cause BT engine 115 to perform a binary translation to thus generate a binary translated or instrumented code segment that can be stored in translation cache 125 and used within execution of the OS/VMM 130 via an instrumented memory 134. Similarly, process AV agent 142 may cause BT engine 115 to perform a binary translation to thus generate a binary translated or instrumented code segment for a corresponding code segment of a process that can be stored in translation cache 125 and used within execution of a process 140 via an instrumented memory 144. Although shown at this high level in the embodiment of FIG. 1, understand the scope of the present invention is not limited in this regard.

Critical kernel and user code (such as APIs) are monitored through transparent code instrumentation by the BT software when requested by the AV/AM agent. The instrumented code transfers control to the AV/AM agent upon detecting violations.

Figure 2:
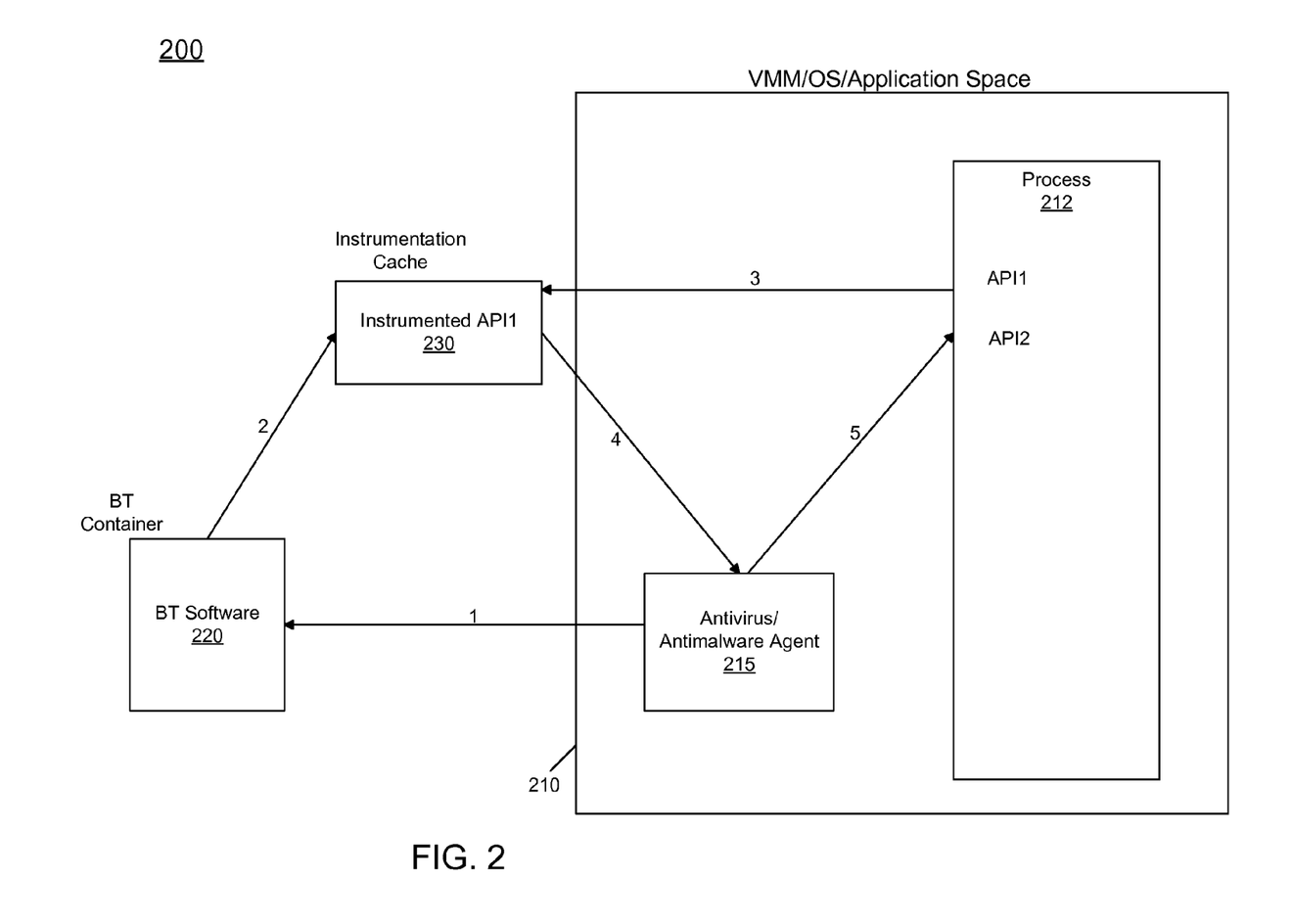
FIG. 2 is a block diagram illustrating control flow of binary translation-assisted execution profiling in accordance with an embodiment of the present invention.

Referring now to FIG. 2, shown is a block diagram illustrating control flow of BT assisted execution profiling in accordance with an embodiment of the present invention. As shown in FIG. 2, a system 200 includes a code space 210 in which VMM/OS/applications execute. In the specific embodiment shown, a process 212 is present including multiple APIs (API1 and API2 are shown, of course the process may include other APIs and additional code). Also present in the code space is an AV agent 215. In an embodiment, this AV agent may be a third party anti-virus software suite that is configured to control BT in accordance with an embodiment of the present invention. As an example, AV agent 215 may be standalone software such as a third party AV software suite that is installed on the platform or executed via a cloud-based mechanism such as via a subscription model. Or in other embodiments, AV agent 215 may be part of a VMM/OS/ application and may be a portion of such code configured to profile code execution and trigger binary translations when appropriate. Although not shown, understand that in any such implementation additional AV code may be present in different code spaces.

As seen in the flow of FIG. 2, responsive to profiling, AV agent 215 causes (as indicated by arrow 1) a BT software 220 located within a BT container to generate instrumented code for some or all of process 212. For example, the AV agent may configure a performance monitoring unit (PMU) of the processor to profile execution of the process. Upon identification of events of interest based at least in part on a result of the profiling, AV agent 215 triggers execution of BT software 220. In the example shown, assume that AV agent 215 instructs BT software 220 to perform a binary translation of API1. As such, when this instrumented code is generated, it is stored in an instrumentation cache 230 (which in an embodiment may be located in system memory), as indicated by arrow 2.

Then during execution of process 212 during runtime, when a call is made to this API (API1), a transparent and lightweight redirection to the instrumented code in instrumentation cache 230 occurs as indicated by arrow 3. Assuming that a flag is raised during execution of this instrumented code, such as a failure of one or more policy checks within the instrumented code, a call is made to AV agent 215 (indicated by arrow 4) to thus perform a full security check on the executing code. Note that if no flags are raised, control passes directly from instrumented code back to native code of the process. Assuming that the check indicates that no virus or other malware is present, control can return back to uninstrumented code 212 at a return point following the instrumented code (at arrow 5). Of course if instead a virus or other malware is indicated, AV agent 215 may take appropriate action, which may prevent the continued execution of process 212. Although shown at this high level in the embodiment of FIG. 2, understand the scope of the present invention is not limited in this regard.

Thus an AV/AM agent running in the OS/VMM environment profiles the applications or kernel and determines the critical code sections such as APIs to be monitored. Once the critical code (e.g., AP1 in the embodiment of FIG. 2) to be monitored is determined, the agent triggers the BT software and passes information about API1 and associated monitoring policies (such as parameter/stack checking, address range checking, etc. to the BT software). Next, the BT software running in the BT container accesses the critical code (API1) and analyzes/generates an instrumented version of API1 code with checks as determined by the monitoring policy set by the AV/AM agent. The BT software copies the instrumented version of the critical code (API1) to the instrumentation cache and programs the BT steering mechanism (which varies depending upon the implementation choices given below).

When API1 is called by the application, the BT steering mechanism steers control to the instrumented code of API1 in the instrumentation cache instead of executing the original API1. The steering is fine grained (less than page size). Accordingly, the instrumented code is executed in a separate address space and all the policy checks as requested by the AV/AM agent are performed. Any violation or failure of checks results in the instrumented code triggering the AV/AM agent. When so triggered, the AV/AM agent performs further analysis and terminates the application if it detects anomalous behavior. If the API1 call is deemed legitimate, the antivirus agent transfers control back to native execution.

For example, assume original code is shown below in Table 1, and the entry point is the address 0x51F008:8BEC.

TABLE 1

| Int foo( ) { | | |
|---|---|---|
| 0x51F005: 8BFF | MOV | EDI,EDI |
| 0x51F007: 55 | PUSH | EBP |
| 0x51F008: 8BEC | MOV | EBP,ESP |
| 0x51F00A: 83E4F8 | AND | ESP,0xF8 |
| 0x51F00D: A144AC5300 | MOV | EAX,DWORD PTR [0x53AC44] |
| ... | | |
| } | | |

The BT software analyzes and generates an instrumented version of the code as below in Table 2, in one embodiment.

The BT software also programs the BT steering unit to detour to the instrumented version when the original code starts executing at the entry point.

TABLE 2

1. Consistency check mode switch to BT
2. Save registers
3. CALL AntiMalware-Agent at programmed entry point if the instrumented code detects any violation
4. Restore registers
5. Execute capsule of instructions replaced: MOV EBP, ESP
6. BTEXIT <0x51F00A>; //resume execution
Note that in another embodiment, the capsule of instructions can be executed by the anti-malware software as well (in that case, BTEXIT occurs in step 5 above).
Anti-Malware agent entry point:
1. Analyze saved register state
2. Apply policy for parameters on stack or in memory
3. Update state that BT should use to return back to instrumented code
4. Return to BT framework One embodiment may be implemented on a HW/SW co-designed processor approach. Of course, other embodiments can be implemented on a non-HW/SW co-designed approach, and different implementation options are also possible.

One possible embodiment is a hardware managed container for BT software, where the BT container created and managed by the hardware/microcode is completely transparent to the entire software stack (VMM/OS/applications). The BT container provides BT instruction set architecture (ISA) extensions for the BT software to access original code. The BT container also provides BT ISA extensions for the AV/AM agent to trigger the BT software. The BT steering unit is provided as part of the processor and may be responsible for steering the execution from the original code to the translated/instrumented version of the original code. Using such an embodiment, the BT container is transparent to the entire software stack. It is possible to monitor/instrument and redirect execution to the instrumented code belonging to any software layer (VMM, OS or applications).

Figure 3:
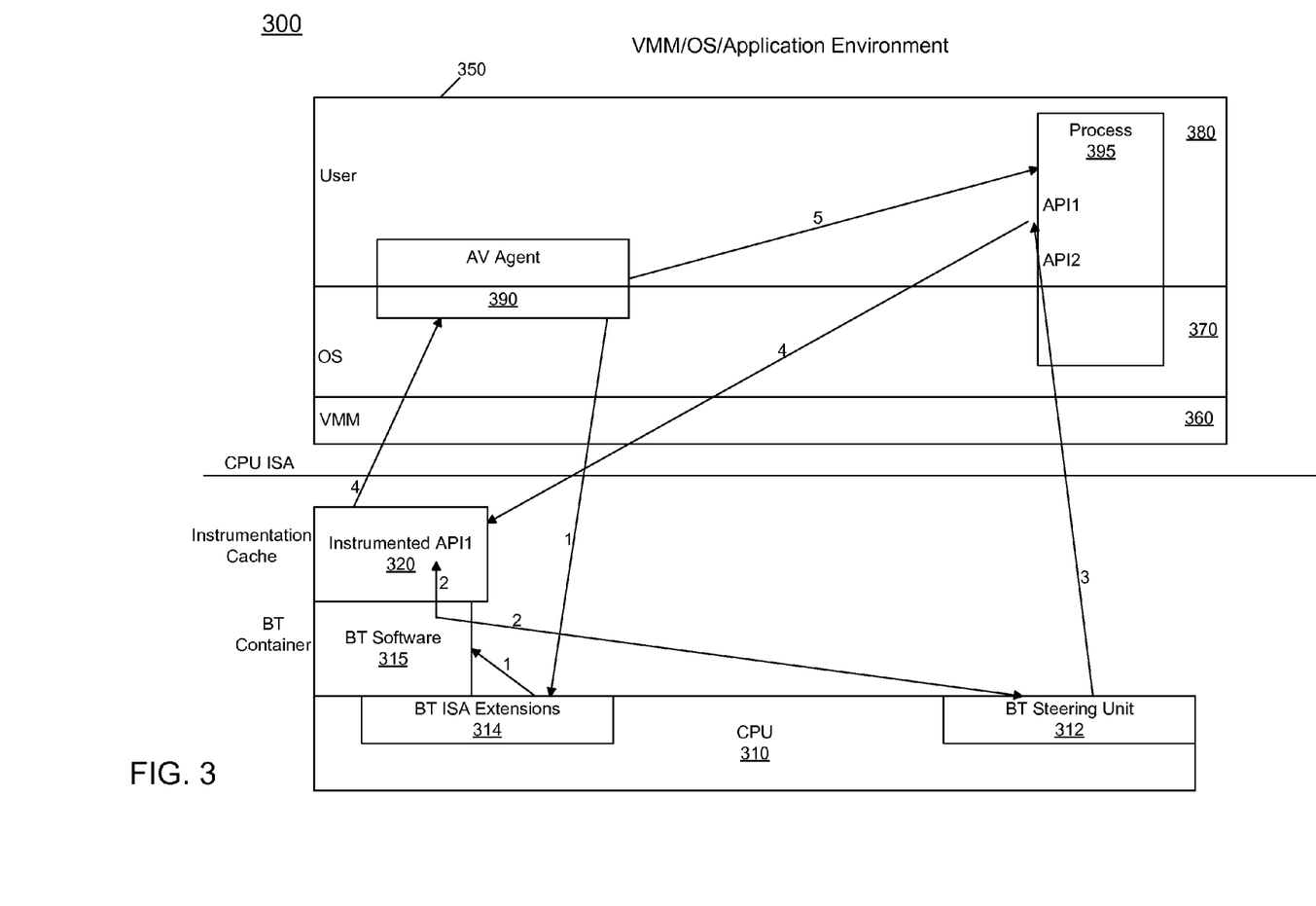
FIG. 3 is a block diagram of a system providing a hardware managed container for binary translation software in accordance with an embodiment of the present invention.

Referring now to FIG. 3, shown is a block diagram of a system providing a hardware managed container for BT software in accordance with an embodiment of the present invention. As shown in FIG. 3, system 300 includes a processor 310 that includes a BT steering unit 312 and BT ISA extensions 314. More specifically, these ISA extensions may execute within a BT container 315 that includes various BT software such as that shown above in FIG. 1 including combinations of ISA instructions, microcode and logic. Via these extensions and BT software 315, instrumented code stored within an instrumentation cache 320 may be generated.

On this bare platform hardware, a software stack 350 executes. In the embodiment shown, the software stack may be implemented in multiple software layers including a VMM layer 360, an OS layer 370, and a user layer 380 in which one or more applications may execute. VMM layer 360 may include a so-called supervisor or hypervisor on which various guest software including an OS and user level applications can execute. In the embodiment shown, an AV agent 390 may execute in the OS/user layers, with different portions of the agent present in these different layers, such as shown in the embodiment of FIG. 1. As further seen in FIG. 3, a process 395 may similarly execute in multiple software layers, namely user layer 380 and OS layer 370.

Still referring to FIG. 3, a control flow is shown where AV agent 390 may (e.g., responsive to profiling) trigger BT software 315 via ISA extensions 314 to generate instrumented code, e.g., for API1 and store the same in instrumentation cache 320 and program BT steering unit 312 to enable a control transfer from execution of native code in process 395 to instrumented code in cache 320. Then during runtime, entry to API1 within process 395 occurs, which thus triggers BT steering unit 312 to cause the instrumented code to be executed. More specifically, a fine-grained context transfer to instrumented code within instrumentation cache 320 occurs that may, e.g., when a violation of one or more policy checks happens, cause a trigger to AV agent 390 to perform further analysis of the potentially offending code. If the code passes, continued execution of process 395, e.g., at a return point of API1 may occur. Otherwise, an appropriate virus/malware handling routine may be performed. Although shown at this high level in the embodiment to FIG. 3, understand the scope of the present invention is not limited in this regard.

Figure 4:
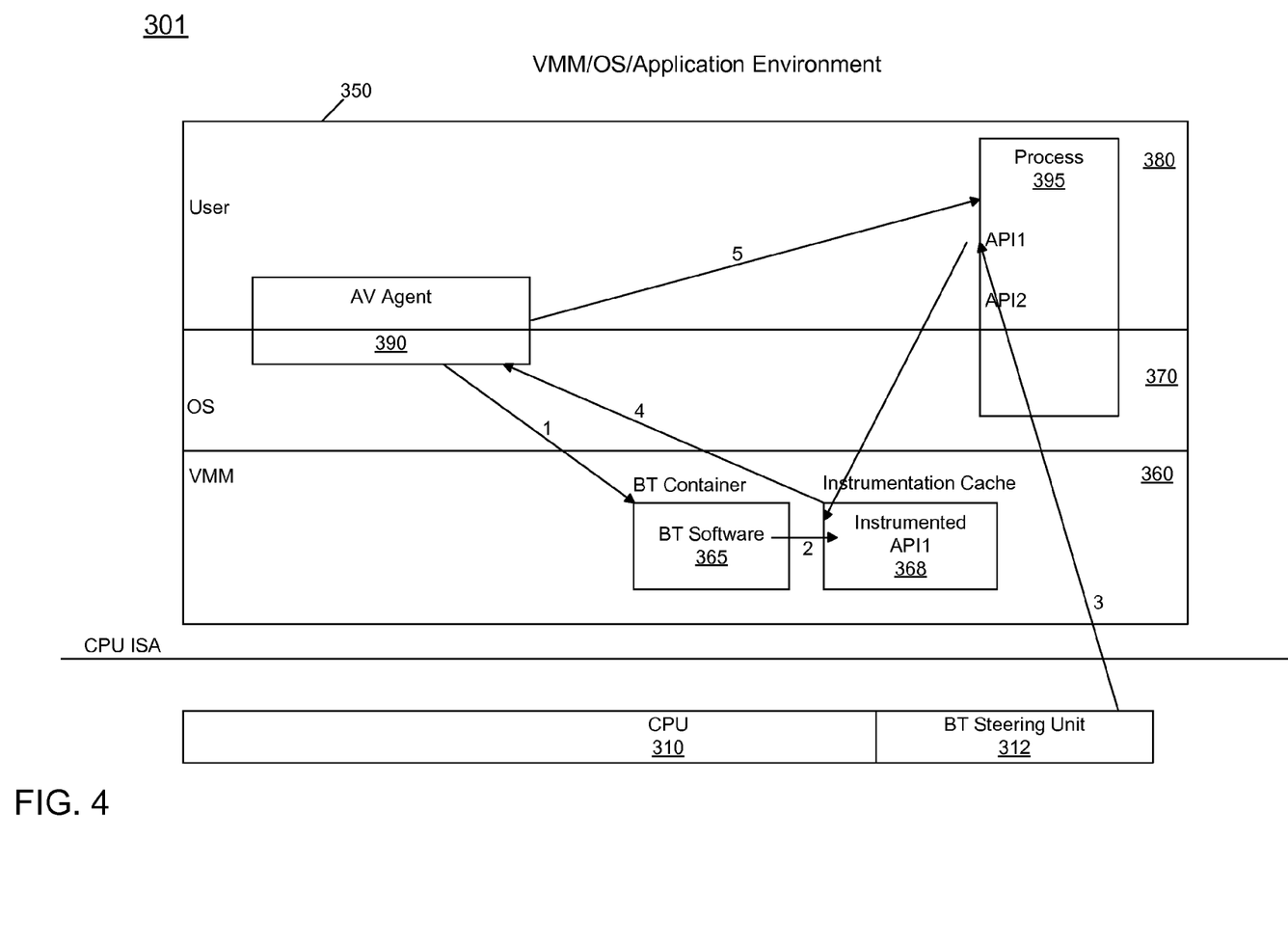
FIG. 4 is a block diagram of a system providing a virtual machine monitor-managed container for binary translation software in accordance with an embodiment of the present invention.

In another embodiment, a VMM software managed container may be provided for BT software. In this embodiment the BT container can be created and managed by the VMM software, but it is still transparent to the OS and applications. As seen in FIG. 4 system 301 may generally be configured as above in system 300 of FIG. 3. However here note that the BT software and the instrumentation cache may be part of a VMM-managed container for BT software. Thus in the embodiment shown in FIG. 4, BT software 365 and instrumentation cache 368 may be part of VMM layer 360. In this embodiment note that AV agent 390 causes BT software 365 to perform binary translation and store the result in instrumentation cache 368. Then, steering unit 312 may directly cause a transfer of control to this instrumented code. As discussed above, should a failure or other violation occur during this code execution, control passes to AV agent 390 and thereafter back to process 395, should the more full analysis by the AV agent indicate that no security concerns are raised. Thus in the embodiment of FIG. 4, an AV/AM agent can trigger the BT software running in the VMM through VM calls in such an embodiment the VMM maps the instrumented code to the process, which is executed as part of the process. In this embodiment, the BT steering unit is implemented as part of the processor and may steer the execution from the original code to the instrumented code. It is also possible for the VMM to emulate the BT steering mechanism through code patching with a self-reference detection (e.g., read-protection) mechanism or the other virtualization technique. Using this embodiment, the BT container is transparent to the OS/application layers. It is possible to monitor/instrument and redirect execution to the instrumented code belonging to OS and applications (OS or applications).

Figure 5:
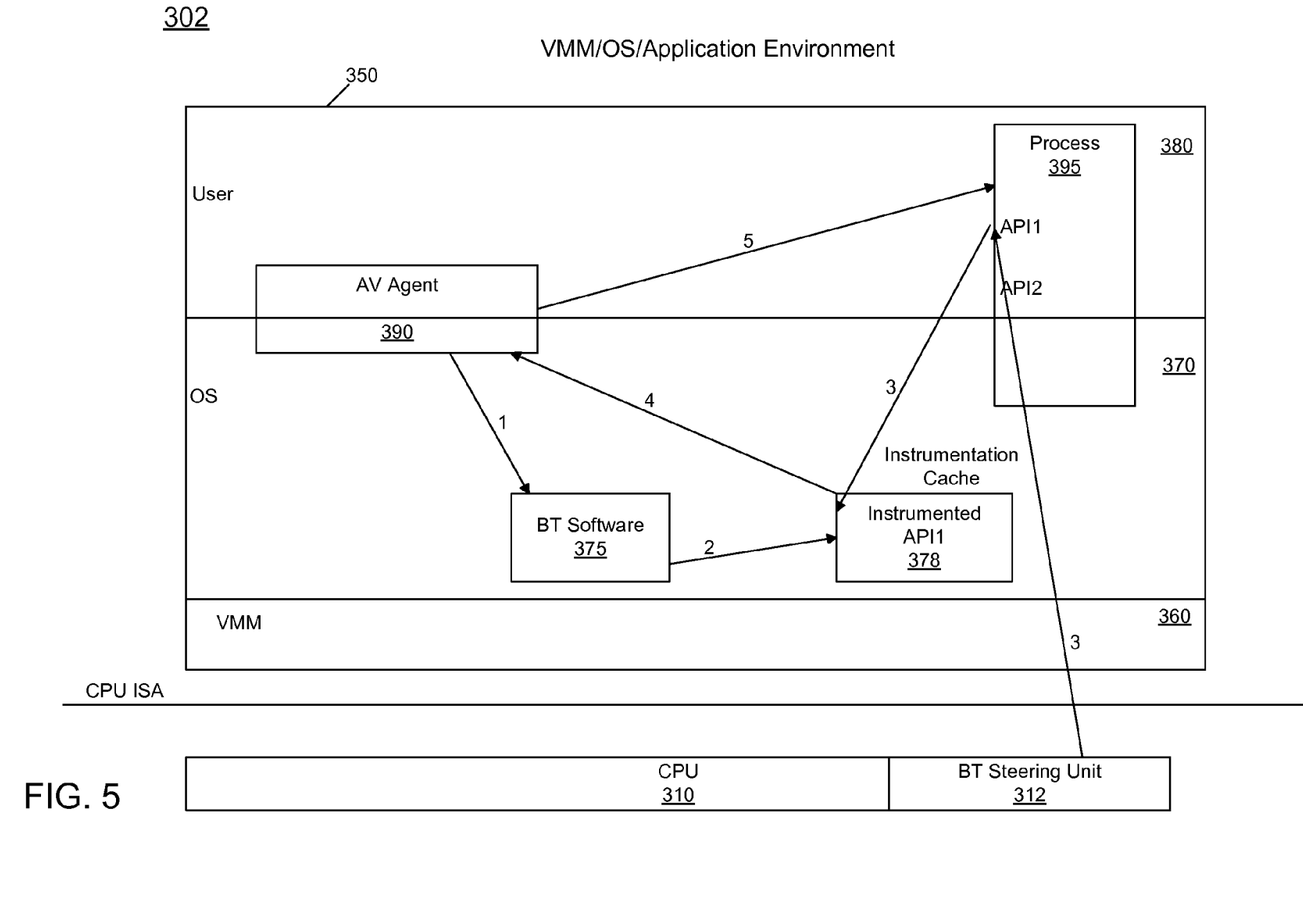
FIG. 5 is a block diagram of a system providing an operating system-managed container for binary translation software in accordance with an embodiment of the present invention.

In a still further embodiment, an OS driver-managed container is provided for the BT software. In this embodiment, the BT container is created and managed by the OS (kernel module or driver) software and is transparent to the applications. Next with reference to FIG. 5, shown is an embodiment in which BT software is located in an OS managed container. Thus as shown in FIG. 5, system 302 may be configured similarly to system 300 above. However here note the presence of BT software 375 and an instrumentation cache 378 within OS layer 370. AV/AM agent 390 triggers BT software 375 using driver calls. The OS (kernel module/driver) maps the instrumented code to the process, which is executed as part of the process. The BT steering unit is implemented as part of the processor and may steer the execution from the original code to the instrumented code. The instrumented code space is allocated as part of process space by the OS software. The OS may also choose to emulate the BT steering mechanism through software mechanisms such as combining page level trap and performing BT for wider code regions such as page level BT for enabling code monitoring and reducing trap overhead.

Figure 6:
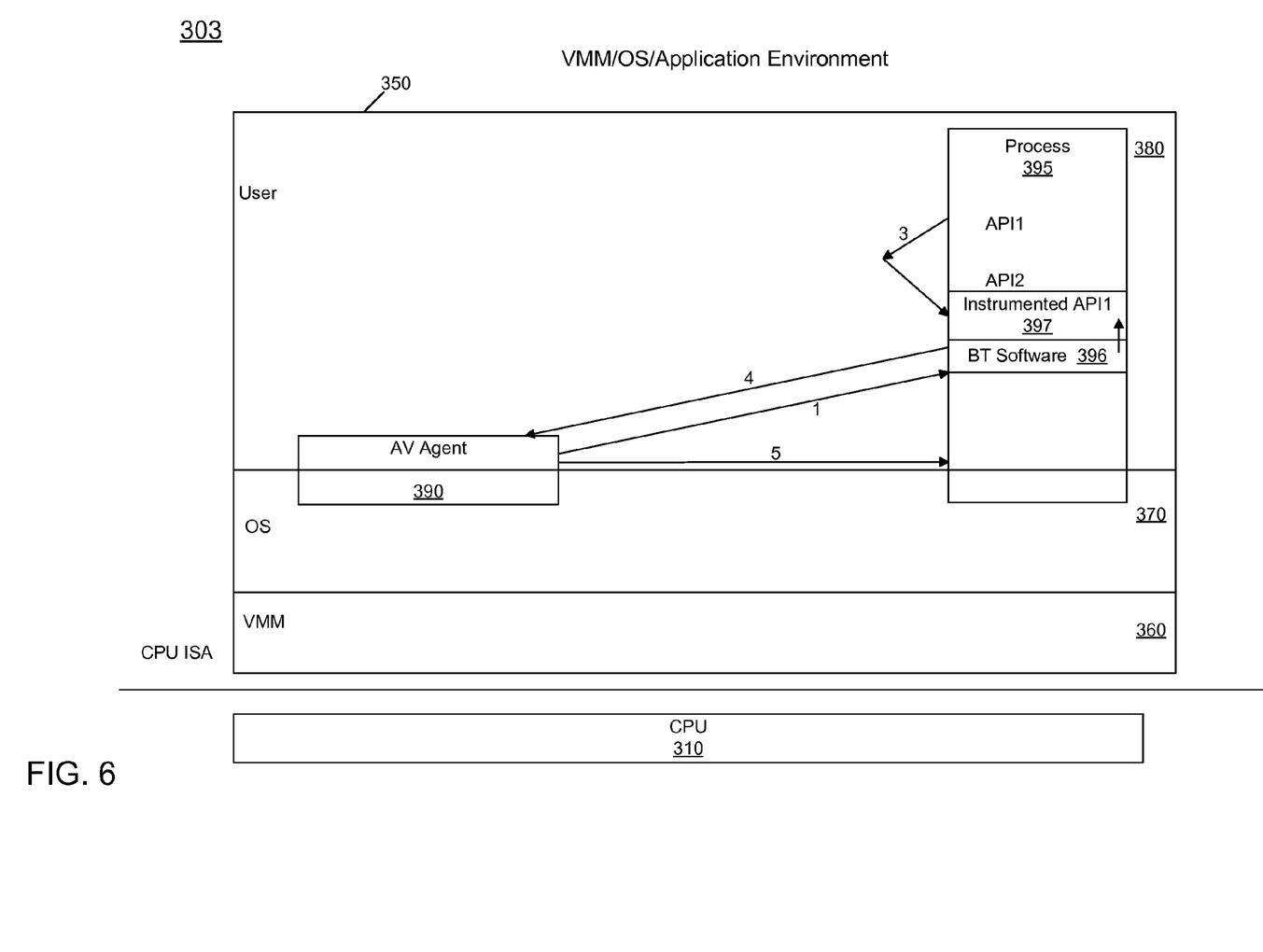
FIG. 6 is a block diagram of a system providing an application-managed container for binary translation software in accordance with an embodiment of the present invention.

In yet another embodiment, the BT software may execute in the application space. In this embodiment, the BT container and software is loaded as part of the process (application) by the AV/AM agent. Thus as shown in FIG. 6, system 303 may be implemented similarly to system 300 of FIG. 3. However here note that BT software 396 may be present within process 395. In addition, an instrumented code segment 397 within the process may correspond to an instrumented version of a given critical code segment of the process, e.g., API1. Thus in this embodiment, the instrumented code space is also allocated as part of the process space. Steering from the original code to the instrumented code can be done using software mechanisms such as combining page level trap and performing page level translation, or other such mechanisms.

Figure 7:
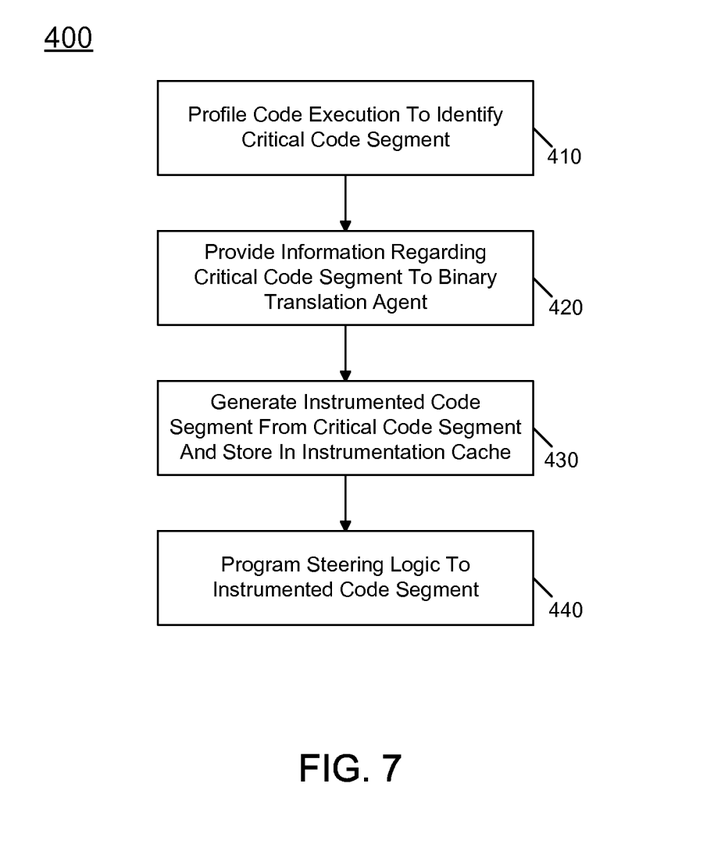
FIG. 7 is a flow diagram of a method for performing binary translation in accordance with an embodiment of the present invention.

Referring now to FIG. 7, shown is a flow diagram of a method in accordance with an embodiment of the present invention. In general method 400 of FIG. 7 may be performed by a combination of various logic of a processor to generate translated code and configure the processor to enable a control transfer to this translated code when a call is made during execution to corresponding native code for which the binary translated code has been generated.

In FIG. 7, method 400 begins by profiling code execution to identify one or more critical code segments (block 410). In the examples described herein, this profiling of code may be performed responsive to profiling instructed by a security agent such as a given AV software. For example, the AV software may configure various counters or other monitors of a performance monitoring unit of a processor to trigger when particular values of these counters or other monitored events occur during execution of code, e.g., to identify a critical code segment. While described as a critical code segment, understand that more generally the AV or other agent seeking to perform profiling may desire to identify certain code segments that have one or more operating parameters of interest to the agent.

Still referring to FIG. 7, after execution proceeds and the profiling is performed, information regarding an identified critical code segment can be provided to a binary translation agent (block 420). As an example, this binary translation agent may be a binary translation engine as described herein. Control next passes to block 430, where an instrumented code segment can be generated from the critical code segment and stored in an instrumentation cache. As an example, this generation of instrumented code may include information provided by the security agent such as a set of one or more policy check routines that are to be inserted into native code to enable in-line checks during execution of this instrumented code. In this way, the instrumented code provides a filter function to perform initial policy checks on behalf of the security agent without the overhead expense of performing a transfer to the security agent. Thus a much less intrusive initial security evaluation may be performed.

With continuing reference to FIG. 7, control next passes to block 440 where steering logic of the processor can be programmed to point to this instrumented code segment. That is, a steering logic such as a BT steering unit may include one or more mapping tables to be updated with an entry to identify a correspondence between the native code segment (namely the identified critical code segment) and the instrumented code segment that is to be executed in favor of the native code segment. This programming may thus enable the logic to perform a transfer or steering of execution from native code to instrumented code when an entry point to the now-translated native code is encountered. Although shown at this high level in the embodiment of FIG. 7, understand the scope of the present invention is not limited in this regard.

Figure 8:
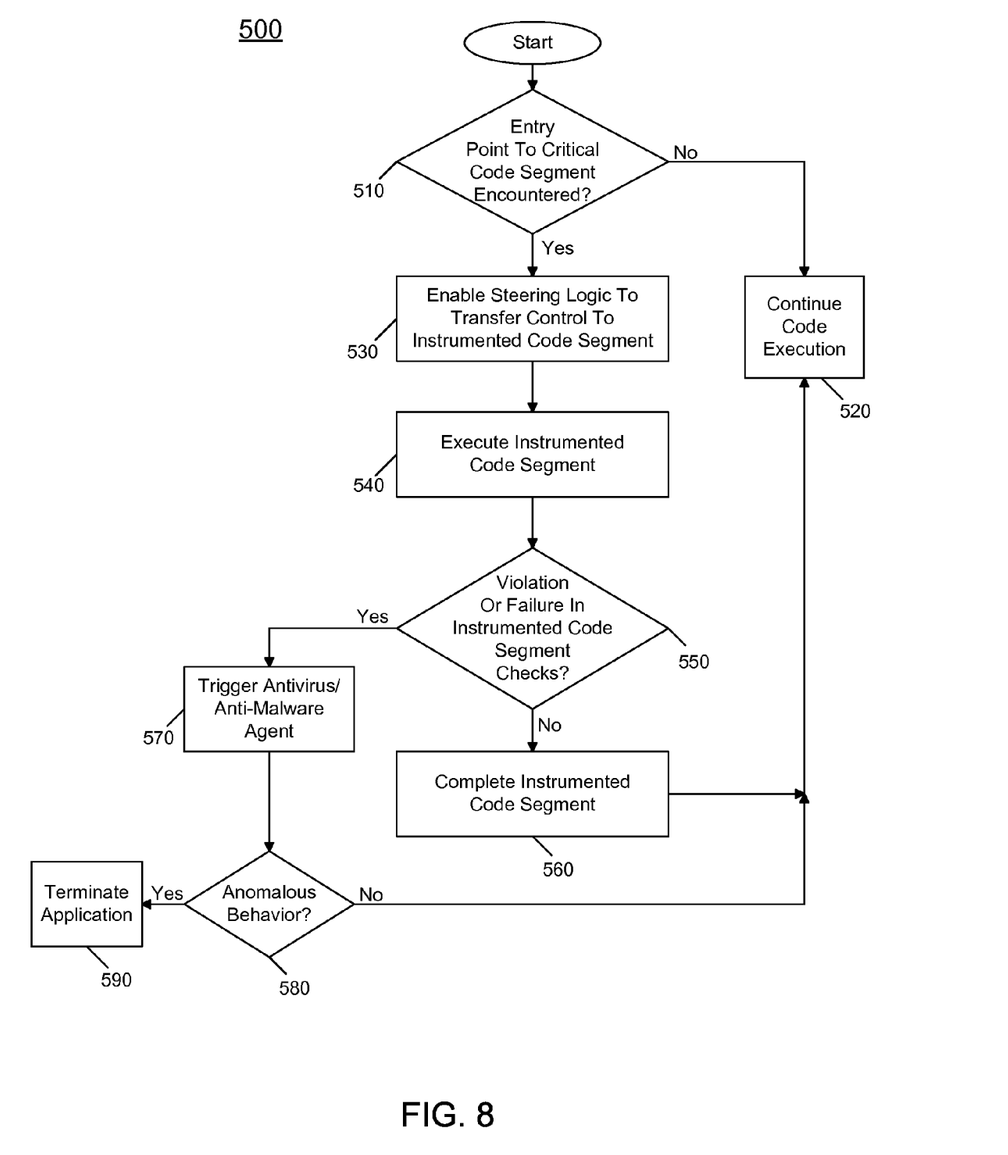
FIG. 8 is a flow diagram of a method for performing a low overhead transfer to translated code in accordance with an embodiment of the present invention.

Referring now to FIG. 8, shown is a flow diagram of a method for performing a low overhead transfer to translated code in accordance with an embodiment of the present invention. Method 500 of FIG. 8 may be executed by various logic of a processor including steering and other processor logic. As seen, method 500 may begin at diamond 510 by determining whether an entry point to a critical code segment has been encountered. In an embodiment this entry point may be a call to a first instruction of a code segment for which a binary translation has been effected. If no such call is received, typical code execution may continue at block 520. Otherwise when a call to such critical code is received, control passes to block 530 where steering logic is enabled to transfer control to an instrumented code segment. In one embodiment, this enabling of control transfer may be effected by access to a mapping table that associates a native code segment entry point with a translated code segment entry point. Thus control passes to block 540 where the instrumented code segment can be executed. More specifically this instrumented code segment, which may be stored in an instrumentation cache, is executed in favor of the native code segment.

In the examples described herein, assume that this instrumented code segment includes one or more policy check routines to be performed on behalf of a security agent. Thus it can be determined at diamond 550 whether a violation or failure has been detected within these policy check routines. If not, control passes to block 560 where the instrumented code segment may be completed and control can then pass back to native code execution at block 520. Otherwise if a violation or failure is detected in these one or more policy code check routines within the instrumented code segment, control passes to block 570. There the security agent (e.g., AV/AM software) may be triggered. This AV security agent may perform more rigorous testing of the code and/or execution environment to determine whether one or more policy violations have occurred. If so, it is determined at diamond 580 that an anomalous behavior has occurred. Accordingly, an appropriate action may be taken, such as termination of the currently executing application, of which these native code segments and instrumented code segments are a part (block 590). Otherwise if it is determined upon more rigorous testing that no anomalous behavior is detected, at block 520 continued execution of the application via native code may occur. Although shown at this high level in the embodiment of FIG. 8, understand the scope of the present invention is not limited in this regard.

Figure 9:
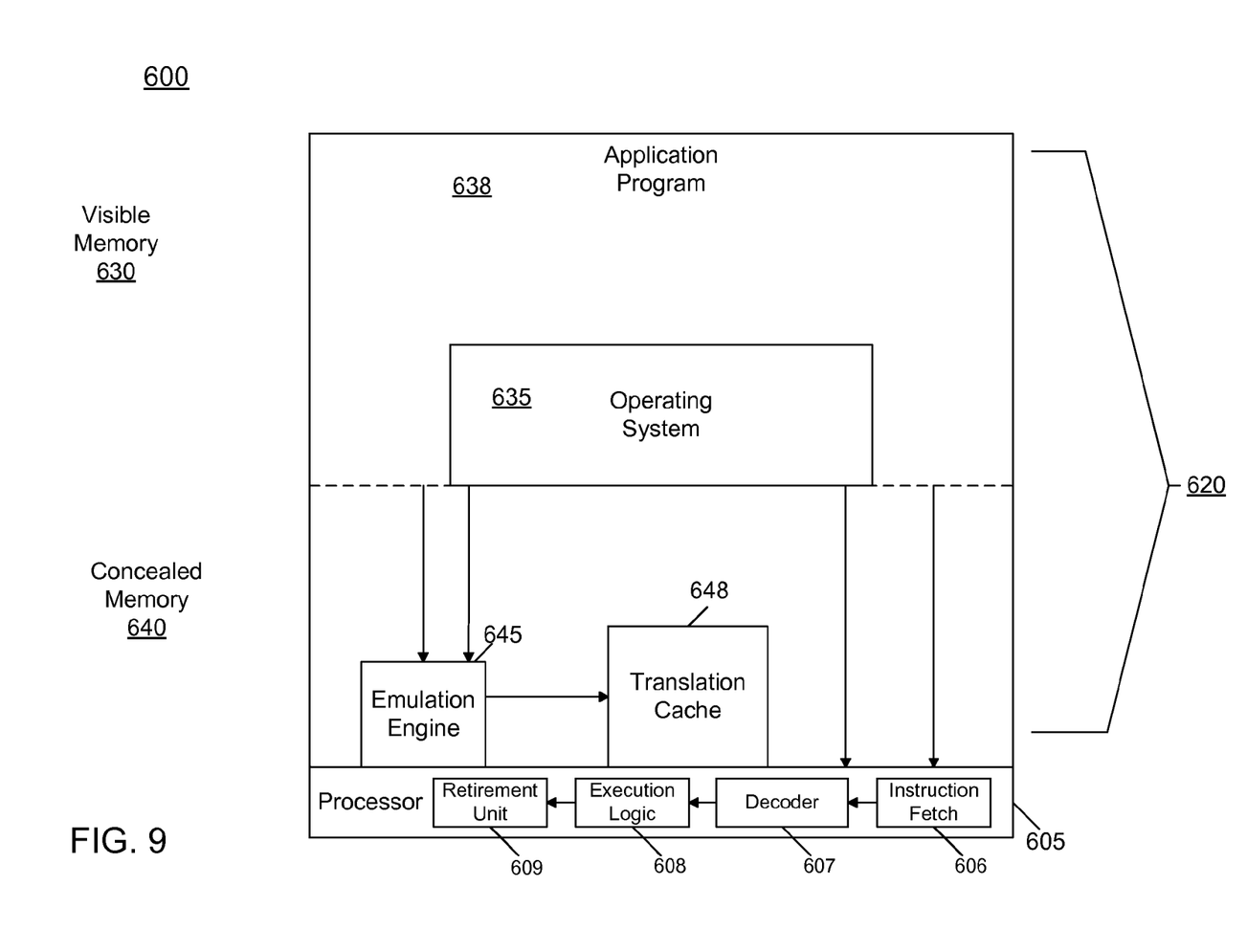
FIG. 9 is a block diagram of a co-design environment including a processor and a memory in accordance with one embodiment of the present invention.

To illustrate components of a processor implemented as a co-designed virtual machine in accordance with an embodiment of the present invention. As shown in FIG. 9, a co-design environment 610 includes a processor 605 and a memory 620 which in one embodiment may be a system memory such as a dynamic random access memory (DRAM). As seen, processor 605 may have a given micro-architecture and may be coupled to memory 620 by way of, e.g., a point-to-point interconnect, bus or other such manner. In a visible portion of memory 620, namely a first portion 630, one or more operating systems 635 and application programs 638 may be stored. This portion is termed "visible" as it can be visible to user-level code (i.e., the application program 638) and visible to the OS (both OS 635 and program 638). Depending on the type of instructions to be executed in these programs, communication may be directly with processor 605, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 640, in order to provide translated code to processor 605. Specifically, as seen, both OS 635 and application program 638 may communicate with a BT engine 645, which may include a runtime execution unit including interpretation, translation and optimization mechanisms. Note that concealed memory 640 is not visible or accessible to the OS or application programs. BT engine 645 may thus provide code and address information to a translation cache 648, which may include translated code that can be provided to processor 605 for execution. In one embodiment, code stored in translation cache 648 may be encrypted. This translated code may be written and optimized for the underlying micro-architecture of the processor, e.g., target ISA code.

As seen, processor 605 which may be a co-design processor, includes front end units such as an instruction fetcher 606 that can receive instructions directly from the OS or application programs. These instructions, which may be macro-instructions, e.g., corresponding to user-level instructions of an application program can be decoded using a decoder 607, which may operate to decode the instruction and access corresponding uops, e.g., present in a microcode storage of processor 605. In turn, decoder 607 may provide the uops to one or more execution units 608, which may include various arithmetic logic units (ALUs), specialized hardware and other types of computation units. Results from these instructions may be provided to a retirement unit 609, which operates to retire the instructions to thus store the results to an architectural state of the processor in program order, if no fault or exceptions occurred. While described as an in-order machine, embodiments can equally be implemented using an out-of-order machine.

Figure 10:
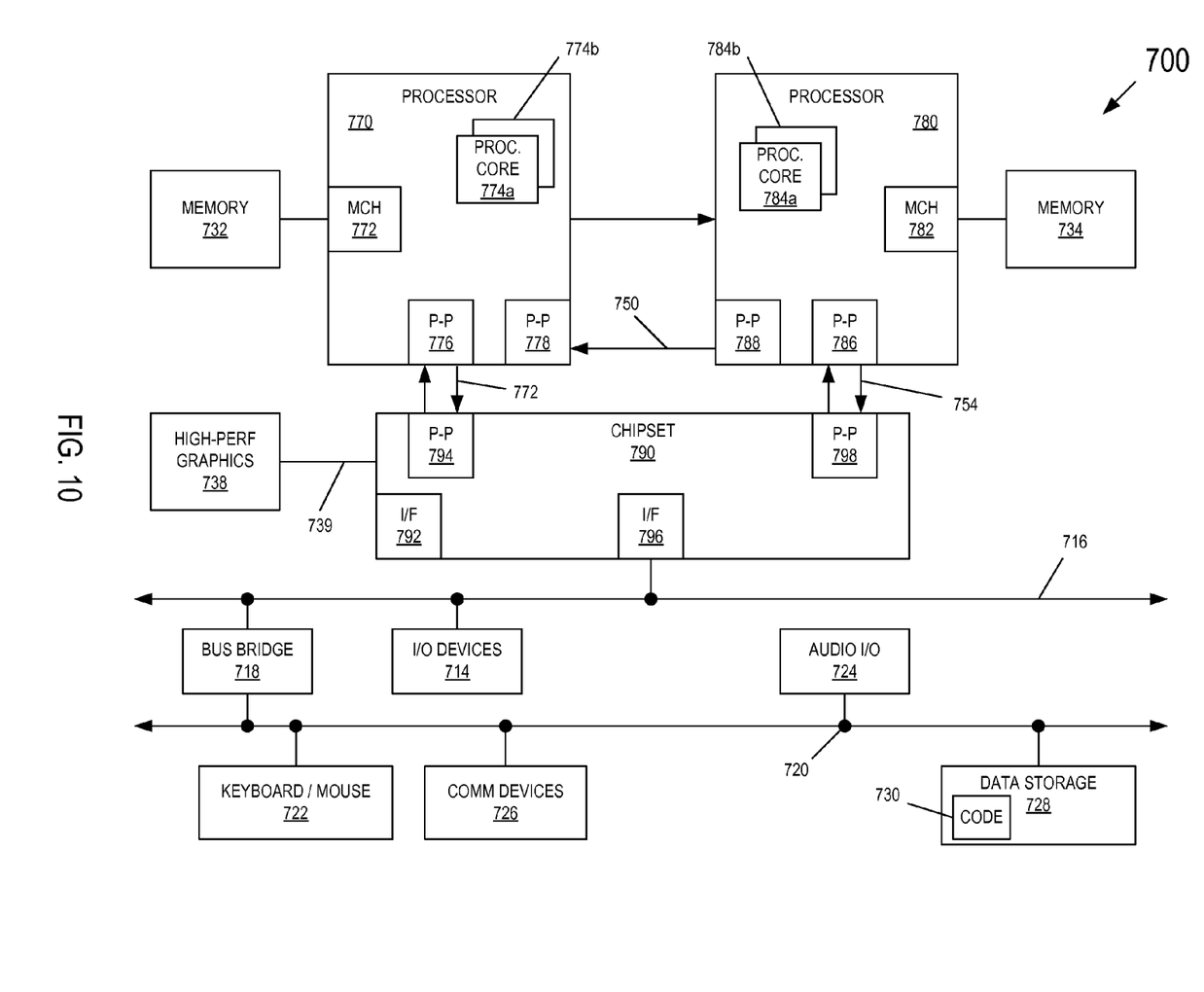
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 700 is a point-to-point interconnect system, and includes a first processor 770 and a second processor 780 coupled via a point-to-point interconnect 750. As shown in FIG. 10, each of processors 770 and 780 may be multicore processors, including first and second processor cores (i.e., processor cores 774a and 774b and processor cores 784a and 784b), although potentially many more cores may be present in the processors. Each of the processors can include logic to create and manage a BT container, as described herein.

Still referring to FIG. 10, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 10, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 10, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 10, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, a system comprises a processor including a binary translation engine to receive a code segment, to generate a binary translation of the code segment, and to store the binary translation in a translation cache, wherein the binary translation includes at least one policy check routine to be executed during execution of the binary translation on behalf of a security agent, the translation cache coupled to the processor to store the binary translation, and a dynamic random access memory (DRAM) coupled to the processor.

In an example, the at least one policy check routine is to cause the processor to trigger the security agent to analyze the binary translation based on a first result of a first policy check of the at least one policy check routine.

In an example, the at least one policy check routine is to cause the processor to continue execution of an application including the code segment based on a second result of the first policy check of the at least one policy check routine, and without triggering of the security agent.

In an example, the security agent is to profile an application including the code segment and to cause the binary translation engine to generate the binary translation responsive to the profiling, the security agent to provide the at least one policy check routine to the binary translation engine for inclusion in the binary translation.

In an example, the processor includes a mapping table including a plurality of entries each to associate a native code segment with a binary translation code segment.

In an example, the processor is to access the mapping table and to execute the binary translation instead of the code segment when an entry point to the code segment is encountered, when the mapping table includes an entry that associates the code segment with the binary translation.

In an example, the binary translation engine includes a steering logic to cause the binary translation to be executed instead of the code segment.

In an example, the binary translation comprises a filter for the security agent, wherein responsive to successful passing of the at least one policy check routine, an application including the code segment is to continue execution without detour to the security agent, the security agent comprising an anti-virus agent.

In another example, at least one computer-readable medium includes instructions that when executed enable a system to, responsive to entry into a first code segment of an application, transfer control to an instrumented code segment associated with the first code segment, the instrumented code segment stored in an instrumentation cache, execute the instrumented code segment to perform at least one policy check on the application requested by a security agent, and enable further execution of the application if the application passes the at least one policy check, and otherwise trigger execution of the security agent.

In an example, execution of the instrumented code segment is in a separate address space from execution of the application.

In an example, instructions to generate the instrumented code segment are in a binary translation engine of a processor of the system.

In an example, the at least one computer-readable medium further comprises instructions to trigger the binary translation engine to generate the instrumented code segment responsive to profiling of the application.

In an example, instructions to provide policy check parameters to the binary translation engine are to enable the binary translation engine to generate the instrumented code segment including policy check code to perform the at least one policy check.

In an example, instructions to profile the application are to identify the first code segment.

In an example, the at least one computer-readable medium further comprises instructions to cause the security agent to terminate the application based on analysis of the instrumented code segment by at least one policy check routine of the security agent.

In an example, instructions to program a steering logic of a processor of the system are to cause the control transfer to the instrumented code segment responsive to encountering an entry point to the first code segment and without patching of the first code segment.

In another example, a method comprises receiving, from a security agent, policy check information for a first code segment in a binary translation agent of a processor, generating an instrumented code segment for the first code segment using the policy check information and storing the instrumented code segment in an instrumentation cache memory, and programming a steering logic of the processor to cause the processor to execute to the instrumented code segment instead of the first code segment when an entry point to the first code segment is encountered.

In an example, the method includes programming the steering logic comprises storing an entry in a mapping table to associate the entry point to a location of the instrumented code segment in the instrumentation cache memory.

In an example, the method further comprises triggering the security agent responsive to a violation of at least one policy check routine of the instrumented code segment, the at least one policy check routine based on the policy check information.

In an example, the method includes profiling execution of an application to identify the first code segment is responsive to programming of a performance monitoring unit of the processor by the security agent, wherein the security agent provides the policy check information to the binary translation agent based at least in part on the profiling.

In another example, a computer readable medium includes instructions to perform the method of any of the above examples.

In another example, an apparatus comprises means for performing the method of any one of the above examples.

In another example, a system comprises processor means including a binary translation means for receiving a code segment, generating a binary translation of the code segment, and storing the binary translation in a translation cache, wherein the binary translation includes at least one policy check routine to be executed during execution of the binary translation on behalf of a security agent, the translation cache coupled to the processor means to store the binary translation, and a dynamic random access memory (DRAM) coupled to the processor.

In an example, the at least one policy check routine is to cause the processor means to trigger the security agent to analyze the binary translation based on a first result of a first policy check of the at least one policy check routine, and to continue execution of an application including the code segment based on a second result of the first policy check of the at least one policy check routine, and without triggering of the security agent.

In an example, the security agent is to profile an application including the code segment and to cause the binary translation means to generate the binary translation responsive to the profiling, the security agent to provide the at least one policy check routine to the binary translation means for inclusion in the binary translation.

In an example, the processor means includes a mapping table including a plurality of entries each to associate a native code segment with a binary translation code segment, and the processor means is to access the mapping table and to execute the binary translation instead of the code segment when an entry point to the code segment is encountered, when the mapping table includes an entry that associates the code segment with the binary translation.

In an example, the binary translation comprises a filter for the security agent, wherein responsive to successful passing of the at least one policy check routine, an application including the code segment is to continue execution without detour to the security agent, the security agent comprising an anti-virus agent.

In an example, the binary translation engine includes a steering logic to cause the binary translation to be executed instead of the code segment.

In another example, an apparatus comprises means for receiving, from a security agent, policy check information for a first code segment in a binary translation agent of a processor, means for generating an instrumented code segment for the first code segment using the policy check information and storing the instrumented code segment in an instrumentation cache memory, and means for programming a steering means of the processor to cause the processor to execute to the instrumented code segment instead of the first code segment when an entry point to the first code segment is encountered.

In an example, means for programming the steering means is to store an entry in a mapping table to associate the entry point to a location of the instrumented code segment in the instrumentation cache memory.

In an example, the apparatus further comprises means for triggering the security agent responsive to a violation of at least one policy check routine of the instrumented code segment, the at least one policy check routine based on the policy check information.

In an example, means for profiling execution of an application to identify the first code segment is responsive to programming of a performance monitoring unit of the processor by the security agent, wherein the security agent provides the policy check information to the binary translation agent based at least in part on the profiling.

In another example, a system for performing binary translation comprises means, responsive to entry into a first code segment of an application, for transferring control to an instrumented code segment associated with the first code segment, the instrumented code segment stored in an instrumentation cache, means for executing the instrumented code segment to perform at least one policy check on the application requested by a security agent, and means for enabling further execution of the application if the application passes the at least one policy check, and otherwise triggering execution of the security agent.

In an example, execution of the instrumented code segment is in a separate address space from execution of the application.

In an example, the system further comprises means for generating the instrumented code segment in a binary translation engine of a processor of the system.

In an example, the means for triggering the binary translation engine is to generate the instrumented code segment responsive to profiling of the application.

In an example, the system further comprises means for providing policy check parameters to the binary translation engine to enable the binary translation engine to generate the instrumented code segment including policy check code to perform the at least one policy check.

In an example, means for profiling the application is to identify the first code segment.

In an example, the system further comprises means for causing the security agent to terminate the application based on analysis of the instrumented code segment by at least one policy check routine of the security agent.

In an example, means for programming a steering logic of a processor of the system is to cause the control transfer to the instrumented code segment responsive to encountering an entry point to the first code segment and without patching of the first code segment.

Understand that various combinations of the above examples are possible.

Embodiments may be implemented in code and may be stored on at least one computer-readable storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a hardware processor including a binary translation engine having a binary translation steering unit and an instrumentation unit, the binary translation engine to receive a code segment responsive to profiling of an application including the code segment by a security agent, to generate a binary translation of the code segment, and to store the binary translation in a translation cache, wherein the binary translation comprises an instrumented version of the code segment including at least one policy check routine comprising one or more security checks embedded therein to be executed as an in-line security check during execution of the binary translation without a transfer of control to the security agent, the transfer of control comprising a context switch;

the translation cache coupled to the hardware processor to store the binary translation; and a physical memory coupled to the hardware processor, wherein the translation cache is located within the physical memory.

2. The system of claim 1, wherein the at least one policy check routine is to cause the hardware processor to trigger the security agent to analyze the binary translation based on a first result of a first policy check of the at least one policy check routine.

3. The system of claim 2, wherein the at least one policy check routine is to further cause the hardware processor to continue execution of an application including the code segment based on a second result of the first policy check of the at least one policy check routine, and without triggering of the security agent.

4. The system of claim 1, wherein the security agent is to provide the at least one policy check routine to the binary translation engine for inclusion in the binary translation.

5. The system of claim 1, wherein the hardware processor includes a mapping table including a plurality of entries each to associate a native code segment with a binary translation code segment.

6. The system of claim 5, wherein the hardware processor is to access the mapping table and to execute the binary translation instead of the code segment when an entry point to the code segment is encountered, when the mapping table includes an entry that associates the code segment with the binary translation.

7. The system of claim 1, wherein the binary translation steering unit is to cause the binary translation to be executed instead of the code segment.

8. The system of claim 1, wherein binary translation comprises a filter for the security agent, wherein responsive to successful passing of the at least one policy check routine, an application including the code segment is to continue execution without detour to the security agent, the security agent comprising an anti-virus agent.

9. At least one non-transitory storage medium having instructions stored thereon for causing a system to:

responsive to entry into a first code segment of an application, transfer control to an instrumented code segment associated with the first code segment, the instrumented code segment stored in an instrumentation cache;

execute the instrumented code segment in a processor of the system, the processor having a binary translation container to include logic to perform at least one policy check comprising one or more security checks on the application requested by a security agent, the at least one policy check embedded in the instrumented code segment and comprising an initial policy check on behalf of the security agent to be performed during the execution of the instrumented code segment without a transfer of control to the security agent, the transfer of control comprising a context switch; and enable further execution of the application if the application passes the at least one policy check, and otherwise trigger execution of the security agent, including the transfer of control to the security agent.

10. The at least one non-transitory storage medium of claim 9, wherein execution of the instrumented code segment is in a separate address space from execution of the application.

11. The at least one non-transitory storage medium of claim 9, further comprising instructions to generate the instrumented code segment in the binary translation container of the processor of the system.

12. The at least one non-transitory storage medium of claim 11, further comprising instructions to trigger the binary translation container to generate the instrumented code segment responsive to profiling of the application.

13. The at least one non-transitory storage medium of claim 11, further comprising instructions to provide policy check parameters to the binary translation container to enable the binary translation engine to generate the instrumented code segment including policy check code to perform the at least one policy check.

14. The at least one non-transitory storage medium of claim 9, further comprising instructions to profile the application to identify the first code segment.

15. The at least one non-transitory storage medium of claim 9, further comprising instructions to cause the security agent to terminate the application based on analysis of the instrumented code segment by at least one policy check routine of the security agent.

16. The at least one non-transitory storage medium of claim 9, further comprising instructions to program a steering logic of the processor of the system to cause the control transfer to the instrumented code segment responsive to encountering an entry point to the first code segment and without patching of the first code segment.

17. A method comprising:

receiving, from a security agent, policy check information for a first code segment in a binary translation engine of a processor, the first code segment identified by profiling execution of an application responsive to programming of a performance monitoring unit including a plurality of counters of the processor by the security agent;

generating, in the binary translation engine, an instrumented code segment for the first code segment using the policy check information and storing the instrumented code segment in an instrumentation cache memory, the instrumented code segment including at least one policy check routine embedded therein comprising one or more security checks; and programming, in the binary translation engine, a steering logic of the processor to cause the processor to execute to the instrumented code segment instead of the first code segment when an entry point to the first code segment is encountered, the execution of the instrumented code segment to perform the at least one policy check routine without a transfer of control to the security agent, the transfer of control comprising a context switch.

18. The method of claim 17, wherein programming the steering logic comprises storing an entry in a mapping table to associate the entry point to a location of the instrumented code segment in the instrumentation cache memory.

19. The method of claim 17, further comprising triggering the security agent responsive to a violation of the at least one policy check routine of the instrumented code segment, the at least one policy check routine based on the policy check information.

* * * * *